United States Patent
Tang et al.

(10) Patent No.: US 11,264,601 B2
(45) Date of Patent: Mar. 1, 2022

(54) METHOD FOR MAKING VANADIUM PENTOXIDE-BASED ACTIVE MATERIAL FOR A CATHODE OF AN ALKALI METAL ION BATTERY, THE VANADIUM PENTOXIDE-BASED ACTIVE MATERIAL, THE CATHODE, AND THE ALKALI METAL ION BATTERY

(71) Applicants: National Chi Nan University, Nantou (TW); Academia Sinica, Taipei (TW)

(72) Inventors: Horng-Yi Tang, Taichung (TW); Maw-Kuen Wu, Taipei (TW); Yan-Ting Chen, Nantou (TW); Prem Chandan Devanga, Nantou (TW)

(73) Assignee: National Chi Nan University, Nantou (TW)

( * ) Notice: Subject to any disclaimer, the term of this patent is extended or adjusted under 35 U.S.C. 154(b) by 102 days.

(21) Appl. No.: 16/189,005

(22) Filed: Nov. 13, 2018

(65) Prior Publication Data
US 2019/0386288 A1 Dec. 19, 2019

(30) Foreign Application Priority Data
Jun. 15, 2018 (TW) ................... 107120828

(51) Int. Cl.
H01M 4/04 (2006.01)
H01M 10/0525 (2010.01)
H01M 4/485 (2010.01)

(52) U.S. Cl.
CPC ......... H01M 4/0459 (2013.01); H01M 4/485 (2013.01); H01M 10/0525 (2013.01)

(58) Field of Classification Search
CPC . H01M 4/00–0459; H01M 4/02–0459; H01M 4/60; H01M 4/0549; H01M 10/0525; H01M 4/485; H01M 4/04
See application file for complete search history.

(56) References Cited

U.S. PATENT DOCUMENTS

2019/0190022 A1* 6/2019 Kim ................... H01M 4/483

FOREIGN PATENT DOCUMENTS

| CN | 103872327 A | 6/2014 |
|---|---|---|
| CN | 103937998 A | 7/2014 |

OTHER PUBLICATIONS

"Prem Chandan, V2O5/C3H6N6: A Hybrid Material with Reversible Lithium Intercalation/Deintercalation in a Wide Potential Range, Oct. 23, 2017", Journal of The Electrochemical Society, A3191-A3192 (Year: 2017).*

(Continued)

*Primary Examiner* — Cynthia H Kelly
*Assistant Examiner* — Niara Trant
(74) *Attorney, Agent, or Firm* — Thomas | Horstemeyer, LLP

(57) ABSTRACT

A method for making a vanadium pentoxide-based active material for a cathode of an alkali metal ion battery includes steps of:
a) preparing an aqueous solution of a triazine derivative of Formula (I)

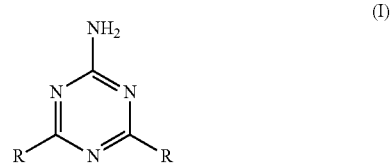

wherein each R independently represents hydrogen or an amino group; and
b) adding vanadium pentoxide to the aqueous solution of the triazine derivative under stirring, so as to permit condensation among hydrolyzed vanadium pentoxide (Continued)

along with self-assembly of the triazine derivatives to obtain a reaction solution containing the active material.

13 Claims, 9 Drawing Sheets

(56) References Cited

OTHER PUBLICATIONS

Search Report appended to an Office Action issued to Taiwanese counterpart application No. 107120828 by the TIPO dated Jan. 4, 2019, with an English translation thereof.

\* cited by examiner

METHOD FOR MAKING VANADIUM PENTOXIDE-BASED ACTIVE MATERIAL FOR A CATHODE OF AN ALKALI METAL ION BATTERY, THE VANADIUM PENTOXIDE-BASED ACTIVE MATERIAL, THE CATHODE, AND THE ALKALI METAL ION BATTERY

CROSS-REFERENCE TO RELATED APPLICATIONS

This application claims priority of Taiwanese Application No. 107120828, filed on Jun. 15, 2018.

FIELD

The disclosure relates to a method for making a vanadium pentoxide-based active material, and more particularly to a method for making a vanadium pentoxide-based active material for a cathode of an alkali metal ion battery. The disclosure also relates to a vanadium pentoxide-based active material, a cathode including the active material, and an alkali metal ion battery including the cathode.

BACKGROUND

Vanadium pentoxide ($V_2O_5$) is a metal oxide having a layered structure and vanadium has many accessible oxidation states. Therefore, vanadium pentoxide stands as a better choice for making a cathode material of an alkali metal ion battery. The cathode material made from vanadium pentoxide allows alkali metal ions to move in (i.e., an intercalation process) and move out (i.e., a deintercalation process) of the structure thereof via a redox reaction. When the alkali metal ions are intercalated into the structure of the cathode material made from vanadium pentoxide, the cathode material thereof has a composition of $M_xV_2O_5$, wherein M is an alkali metal and x is a molar ratio of the intercalated alkali metal ions to vanadium pentoxide.

Although vanadium pentoxide is suitable for making the cathode material of the alkali metal ion battery, vanadium pentoxide is reduced, followed by phase transformation during the intercalation process of the alkali metal ion. For example, during the intercalation process of a lithium ion in a lithium ion battery, vanadium pentoxide is reduced, followed by the phase transformation in a sequence of reversible α-phase (x in the composition of $M_xV_2O_5$ is larger than 0.01 and less than 0.35), ε-phase (x in the composition of $M_xV_2O_5$ is larger than 0.35 and less than 0.7) to partially reversible δ-phase (x in the composition of $M_xV_2O_5$ is 1), and finally to irreversible γ-phase (x in the composition of $M_xV_2O_5$ is 2) and ω-phase (x in the composition of $M_xV_2O_5$ is 3). These irreversible phases are due to the structural puckering of vanadium pentoxide layers held by vander Waals force when vanadium pentoxide is intercalated with excess lithium ions. Such irreversible phase transformation of vanadium pentoxide causes structural instability thereof which negatively affects cycling performance and capacity of the cathode material in the lithium ion battery.

It is desirable that those skilled in the art can provide a cathode material for an alkali ion battery to overcome the shortcomings described above.

SUMMARY

Therefore, a first object of the disclosure is to provide a method for making a vanadium pentoxide-based active material which can be used for a cathode of an alkali metal ion battery to overcome the shortcomings of the prior art.

A second object of the disclosure is to provide a vanadium pentoxide-based active material which can be used for a cathode of an alkali metal ion battery to overcome the shortcomings of the prior art.

A third object of the disclosure is to provide a cathode which includes the vanadium pentoxide-based active material.

A fourth object of the disclosure is to provide an alkali metal ion battery which includes the cathode.

According to a first aspect of the disclosure, there is provided a method for making a vanadium pentoxide-based active material for a cathode of an alkali metal ion battery. The method comprises steps of:

a) preparing an aqueous solution of a triazine derivative of Formula (I)

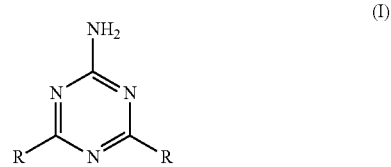

wherein each R independently represents hydrogen or an amino group; and b) adding vanadium pentoxide to the aqueous solution of the triazine derivative under stirring for a period of time, so as to permit condensation among hydrolyzed vanadium pentoxide along with self-assembly of the triazine derivatives to obtain a reaction solution containing the active material.

According to a second aspect of the disclosure, there is provided a vanadium pentoxide-based active material for a cathode of an alkali metal ion battery. The vanadium pentoxide-based active material comprises:

vanadium pentoxide; and a triazine derivative of Formula (I) hybridized with the vanadium pentoxide,

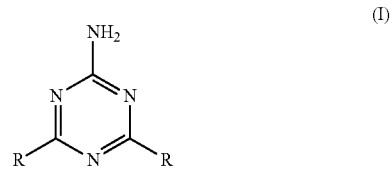

wherein each R independently represents hydrogen or an amino group.

According to a third aspect of the disclosure, there is provided a cathode of an alkali metal ion battery. The cathode includes the vanadium pentoxide-based active material.

According to a fourth aspect of the disclosure, there is provided an alkali metal ion battery which includes the cathode.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
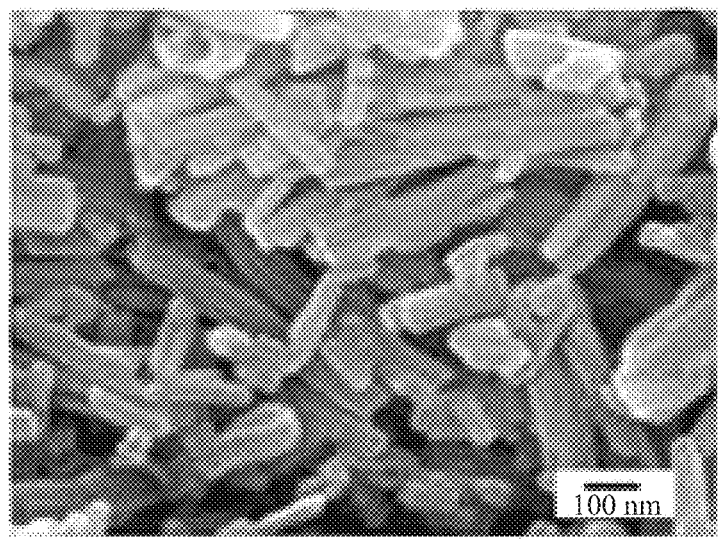
FIG. 1 is a Field-Emission Scanning Electron Microscope (FE-SEM) image illustrating morphology of a vanadium pentoxide-based active material of Example 3.

An embodiment of a method for making a vanadium pentoxide-based active material for a cathode of an alkali metal ion battery according to the disclosure comprises steps of:

a) preparing a saturated aqueous solution of a triazine derivative of Formula (I)

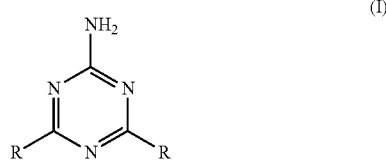

(I)

wherein each R independently represents hydrogen or an amino group;

b) adding vanadium pentoxide to the aqueous solution of the triazine derivative under stirring for a period of time, so as to permit condensation among hydrolyzed vanadium pentoxide along with self-assembly of the triazine derivatives to obtain a reaction solution containing the active material;

c) separating the active material from the reaction solution; and d) drying the active material to obtain a brownish powder.

In certain embodiments, the triazine derivative is selected from the group consisting of melamine, 2-amino-1,3,5-triazine, and a combination thereof.

In certain embodiments, the vanadium pentoxide is doped with a transition metal salt.

In certain embodiments, the transition metal salt is selected from the group consisting of a manganese salt, a copper salt, a tin salt, and combinations thereof.

In certain embodiments, in step b), the reaction solution has a reduced pH value. In certain embodiments, the pH value of the reaction solution is reduced by 3.6. In certain embodiments, the pH value of the reaction solution is reduced from 8.2 to 4.6 in step b).

In certain embodiments, in step b), a molar ratio of the triazine derivative in the saturated aqueous solution to the vanadium pentoxide of Formula (I) is in a range from 0.30 to 1.0. In certain embodiments, the molar ratio is in a range from 0.34 to 1.0. In certain embodiments, the molar ratio is in a range from 0.5 to 0.7.

In certain embodiments, step b) is implemented by dissolving the vanadium pentoxide and the transition metal salt in hydrogen peroxide to form a hydrogen peroxide solution, followed by adding the hydrogen peroxide solution to the saturated aqueous solution of the triazine derivative.

In certain embodiments, step b) is implemented under stirring at a temperature from 15° C. to 40° C. In certain embodiments, step b) is implemented under stirring at a temperature from 20° C. to 30° C.

In certain embodiments, the period of time for implementing step b) is in a range from 20 hours to 30 hours. In certain embodiments, the period of time for implementing step b) is in a range from 23 hours to 25 hours.

In certain embodiments, step d) is implemented at a temperature from 75° C. to 105° C. In certain embodiments, step d) is implemented at a temperature from 79° C. to 101° C.

An embodiment of a vanadium pentoxide-based active material for a cathode of an alkali metal ion battery according to the disclosure comprises the vanadium pentoxide and the triazine derivative of Formula (I) that is hybridized with the vanadium pentoxide.

In certain embodiments, the triazine derivative is selected from the group consisting of melamine, 2-amino-1,3,5-triazine, and a combination thereof, as described above.

In certain embodiments, the vanadium pentoxide is doped with the transition metal salt, as described above.

In certain embodiments, the transition metal salt is selected from the group consisting of a manganese salt, a copper salt, a tin salt, and combinations thereof, as described above. In certain embodiments, the manganese salt is a manganese salt having a valence of +2, for example, $Mn(NO_3)_2$. The copper salt is a copper salt having a valence of +2, for example, $Cu(NO_3)_2$. The tin salt is a tin salt having a valence of +4, for example, $SnCl_4$.

In certain embodiments, in the vanadium pentoxide-based active material, a molar ratio of the triazine derivative to the vanadium pentoxide is in a range from 0.4 to 0.8. In certain embodiments, the molar ratio of the triazine derivative to the vanadium pentoxide is in a range from 0.6 to 0.7.

It should be noted that when the vanadium pentoxide is doped with the transition metal salt, the molar ratio of the triazine derivative to the vanadium pentoxide is a molar ratio of the triazine derivative to a combination of the vanadium pentoxide and the transition metal salt.

In certain embodiments, when the vanadium pentoxide is doped with the transition metal salt, a molar amount of the vanadium pentoxide is in a range from 90 mol % to 99 mol % and a molar amount of the transition metal salt is in a range from 1 mol % to 10 mol % based on a total molar amount of the combination of the vanadium pentoxide and the transition metal salt. In certain embodiments, the molar amount of the vanadium pentoxide is in a range from 94 mol % to 96 mol % and the molar amount of the transition metal salt is in a range from 4 mol % to 6 mol % based on the total molar amount of the combination of the vanadium pentoxide and the transition metal salt.

It should be noted that the vanadium pentoxide-based active material of the disclosure may exist in various forms, for example, in a form of powders or in a form of a thin film. In certain embodiments, the vanadium pentoxide-based active material of the disclosure is composed of a plurality of powders, each of which includes the vanadium pentoxide and the triazine derivative of Formula (I) that is hybridized with the vanadium pentoxide. When the vanadium pentoxide-based active material of the disclosure is composed of a plurality of powders, the particle sizes of the powders may be varied by adjusting processing parameters of the method for making the vanadium pentoxide-based active material according to the disclosure, and such processing parameters are apparent to those skilled in the art. Therefore, the particle sizes of the powders are not specifically limited to those of the disclosure, and may be nano-scaled or may not be nano-scaled (for example, may be micro-scaled). In certain embodiments, each of the powders is composed of a plurality of primary particles. In certain embodiments, each of the primary particles has a size ranging from 100 nm to 200 nm.

The vanadium pentoxide-based active material of the disclosure may be used for a cathode of an alkali metal ion battery. In addition to the vanadium pentoxide-based active material, the cathode further includes a conductive material and a binder for binding the vanadium pentoxide-based active material to the conductive material. A non-limiting example of the conductive material is conductive carbon, and a non-limiting example of the binder is polyvinylidene difluoride (PVDF).

In certain embodiments, a weight ratio of the conductive material to the vanadium pentoxide-based active material is in a range from 0.05 to 0.25. In certain embodiments, the weight ratio of the conductive material to the vanadium pentoxide-based active material is in a range from 0.08 to 0.18.

In certain embodiments, a weight ratio of the binder to the vanadium pentoxide-based active material is in a range from 0.05 to 0.25. In certain embodiments, the weight ratio of the binder to the vanadium pentoxide-based active material is in a range from 0.08 to 0.18.

In certain embodiments, the vanadium pentoxide-based active material is mixed thoroughly with the conductive material and the binder in a cathode solvent to form a homogeneous slurry. A non-limiting example of the cathode solvent is 1-methyl-2-pyrrolidone (NMP).

In certain embodiments, a weight ratio of a combination of the vanadium pentoxide-based active material, the conductive material, and the binder to the cathode solvent is in a range from 0.7 to 1.2.

The homogeneous slurry is then coated on an aluminum foil to prepare the cathode.

The cathode thus prepared may be used for an alkali metal ion battery.

Examples of the alkali metal ion battery include, but are not limited to, a lithium ion battery, a sodium ion battery, and a potassium ion battery.

In addition to the cathode, the alkali metal ion battery further includes an anode and an electrolyte solution. The anode may be made from carbon or an alkali metal. Examples of the alkali metal include, but are not limited to, lithium, sodium, and potassium. A non-limiting example of the electrolyte solution is a solution of an alkali metal salt. Examples of the alkali metal salt include, but are not limited to, lithium hexafluorophosphate ($LiPF_6$, which is used for a lithium ion battery) and sodium perchlorate ($NaClO_4$, which is used for a sodium ion battery). In certain embodiments, the alkali metal salt in the electrolyte solution is in a concentration ranging from 0.9 M to 1.5 M.

In certain embodiments, the electrolyte solution is prepared by dissolving the alkali metal salt in an electrolyte solvent. A non-limiting example of the electrolyte solvent is a combination of ethylene carbonate and dialkyl carbonate. Examples of dialkyl carbonate include, but are not limited to, dimethyl carbonate, diethyl carbonate, and a combination thereof. In certain embodiments, a volume ratio of ethylene carbonate to dialkyl carbonate is in a range from 0.9 to 1.1.

While not bound by theory, the applicants believe that the triazine derivative of Formula (I) is used as a structure stabilizing agent to make the vanadium pentoxide-based active material of the disclosure through the self-assembly of the triazine derivative that is confined by parallel vanadium pentoxide platelets. The vanadium pentoxide-based active material of the disclosure is formed with a single phase hybrid structure with extended interlayer distance. Inter-molecular and intra-molecular hydrogen bonds formed in the vanadium pentoxide-based active material of the disclosure assist in maintaining structural reversibility and reducing lattice stress during the intercalation and deintercalation processes of the alkali metal ion so as to effectively prevent the vanadium pentoxide platelets from puckering. Therefore, the capacity of the alkali metal ion battery including the cathode coated with the vanadium pentoxide-based active material of the disclosure is not undesirably lost after a plurality of charge/discharge cycles in a relatively wide potential range. The aforesaid shortcomings resulted from using vanadium pentoxide alone as the active material for the cathode of the alkali metal ion battery can thus be overcome.

Examples of the disclosure will be described hereinafter. It is to be understood that these examples are exemplary and explanatory and should not be construed as a limitation to the disclosure.

Preparative Example 1: Preparation of Vanadium Pentoxide Powders

Vanadium pentoxide (Manufacturer: Showa Chemical Industry Co., Ltd.; purity: ~99%) was annealed at 500° C. for 6 hours to obtain vanadium pentoxide powders in a dehydrated form.

Examples 1 to 3: Preparation of Vanadium Pentoxide-Based Active Materials in which Vanadium Pentoxide was Undoped with a Transition Metal Salt Vanadium pentoxide-based active materials of Examples 1 to 3 were each prepared according to the following process using a molar ratio of melamine to vanadium pentoxide ($C_3H_6N_6/V_2P_5$) shown in Table 1.

TABLE 1

| Example. | $C_3H_6N_6/V_2O_5$ (a molar ratio) |
|---|---|
| 1 | 0.35 |
| 2 | 0.67 |
| 3 | 1 |

Melamine (Manufacturer: Acros Organics; purity: ~99%) was mixed with water in a ratio of 2.57 mmol of melamine to 100 ml of water through ultrasonication to dissolve melamine in the water so as to obtain a saturated aqueous solution of melamine.

Vanadium pentoxide powders of Preparative Example 1 were added to the saturated aqueous solution of melamine under stirring at room temperature for a period of 24 hours to obtain a reddish-brown reaction solution containing the vanadium pentoxide-based active material.

While not bound by theory, the applicants believe that during the addition of vanadium pentoxide powders to the saturated aqueous solution of melamine, vanadium peroxide was gradually hydrolyzed in the saturated aqueous solution of melamine (an alkaline solution having a pH of 8.2), followed by condensation with simultaneous self-assembly of melamine with reduction of pH from 8.2 to 4.6.

The reaction solution was then filtered to obtain a crude powdery product, which was washed using deionized water to remove unreacted melamine, followed by vacuum drying at 80° C. to obtain the vanadium pentoxide-based active material in a brownish powder form.

In the thus obtained vanadium pentoxide-based active materials of Examples 1 to 3, self-assembly of the triazine derivative is confined by parallel vanadium pentoxide platelets, and each of the vanadium pentoxide-based active material of Examples 1 to 3 has a composition of $(C_3H_6N_6)_{0.67}V_2O_5$.

Examples 4 to 6: Preparation of Vanadium Pentoxide-Based Active Materials in which Vanadium Pentoxide was Doped with a Transition Metal Salt Vanadium pentoxide-based active materials of Examples 4 to 6 were prepared according to the following process using the transition metal salts shown in Table 2.

Melamine (Manufacturer: Acros Organics; purity: ~99%) was mixed with water in a ratio of 2.57 mmol of melamine to 100 ml of water through ultrasonication to dissolve melamine in the water so as to obtain a saturated aqueous solution of melamine.

Vanadium pentoxide of Preparative Example 1 and the transition metal salt shown in Table 2 were dissolved in hydrogen peroxide to form a hydrogen peroxide solution of vanadium pentoxide doped with the transition metal salt.

TABLE 2

| Example | Transition metal salts |
|---|---|
| 4 | $Mn(NO_3)_2$ |
| 5 | $Cu(NO_3)_2$ |
| 6 | $SnCl_4$ |

The hydrogen peroxide solution thus formed was added to the saturated aqueous solution of melamine under stirring at room temperature for a period of 24 hours to obtain a reddish-brown reaction solution containing the vanadium pentoxide-based active material.

A weight ratio of a combination of vanadium pentoxide and the transition metal salt to hydrogen peroxide is 1. In the reaction solution, a molar amount of vanadium pentoxide is 95 mol % and a molar amount of the transition metal salt is 5 mol % based on a total molar amount of the combination of vanadium pentoxide and the transition metal salt. A molar ratio of melamine to a combination of vanadium pentoxide and the transition metal salt is 1.

The reaction solution was then filtered to obtain a crude powdery product, which was washed using deionized water to remove unreacted melamine, followed by vacuum drying at 100° C. to obtain the vanadium pentoxide-based active material.

In the thus obtained vanadium pentoxide-based active materials of Examples 4 to 6, self-assembly of the triazine derivative is confined by parallel vanadium pentoxide platelets doped with the transition metal salt, and a molar ratio of melamine to vanadium pentoxide doped with the transition metal salt is 0.67. A molar amount of vanadium pentoxide is 95 mol % and a molar amount of the transition metal salt is 5 mol % based on a total molar amount of the combination of vanadium pentoxide and the transition metal salt.

Application Example 1: Preparation of a Lithium Ion Battery in a Form of a Coin Cell The vanadium pentoxide-based active material of Example 3 was mixed thoroughly with conductive carbon and polyvinylidene difluoride (PVDF, serving as a binder), followed by addition of 1-methyl-2-pyrrolidone (NMP, 20 ml) with stirring to obtain a homogeneous slurry in which a weight ratio of a combination of the vanadium pentoxide-based active material, conductive carbon, and PVDF to NMP was 1, and a weight ratio of the vanadium pentoxide-based active material, conductive carbon and PVDF was 80:10:10.

The homogeneous slurry was coated on an aluminum foil using a 300 μm doctor blade to prepare an electrode, which was baked in an oven at 80° C., followed by punching to obtain a disc.

A lithium ion battery in a form of a coin cell was assembled in a glove box using the disc as a cathode, a lithium metal disc as an anode, and a 1.0 M solution of $LiPF_6$ in a combination with ethylene carbonate and diethyl carbonate (a volume ratio of 1:1) as an electrolyte solution.

The lithium ion battery thus assembled was activated by three cycles of a 0.1 C charge/discharge process at a potential ranging from 3.1 V to 3.5 V.

Application Example 2: Preparation of a Lithium Ion Battery in a Form of a Coin Cell The procedures for preparing a lithium ion battery of Application Example 2 are similar to those of Application Example 1, except that vanadium pentoxide-based active material of Example 5 was used.

Application Example 3: Preparation of a Lithium Ion Battery in a Form of a Coin Cell The procedures for preparing a lithium ion battery of Application Example 3 are similar to those of Application Example 1, except that a sodium metal disc was used as an anode and a 1.0 M solution of $NaClO_4$ in a combination with ethylene carbonate and dimethyl carbonate (a volume ratio of 1:1) was used as an electrolyte solution.

Comparative Application Example 1: Preparation of a Lithium Ion Battery in a Form of a Coin Cell The procedures for preparing a lithium ion battery of Comparative Application Example 1 are similar to those of Application Example 1, except that a homogeneous slurry prepared by mixing the vanadium pentoxide powders of Preparative Example 1 with conductive carbon and polyvinylidene difluoride added to 1-methyl-2-pyrrolidone was used.

Field-Emission Scanning Electron Microscope (FE-SEM) Analysis:

A. Analysis Method:

The vanadium pentoxide-based active material of Example 3 was observed using a field-emission scanning electron microscope with energy dispersive spectrometer (FE-SEM-EDS, Manufacturer: Hitachi, Ltd., Japan; Model: S4200,) to obtain an FE-SEM image as shown in FIG. 1.

B. Result and Discussion:

As shown in FIG. 1, the vanadium pentoxide-based active material of Example 3 is composed of a plurality of powdery particles having a diameter of less than 100 nm.

Figure 2:
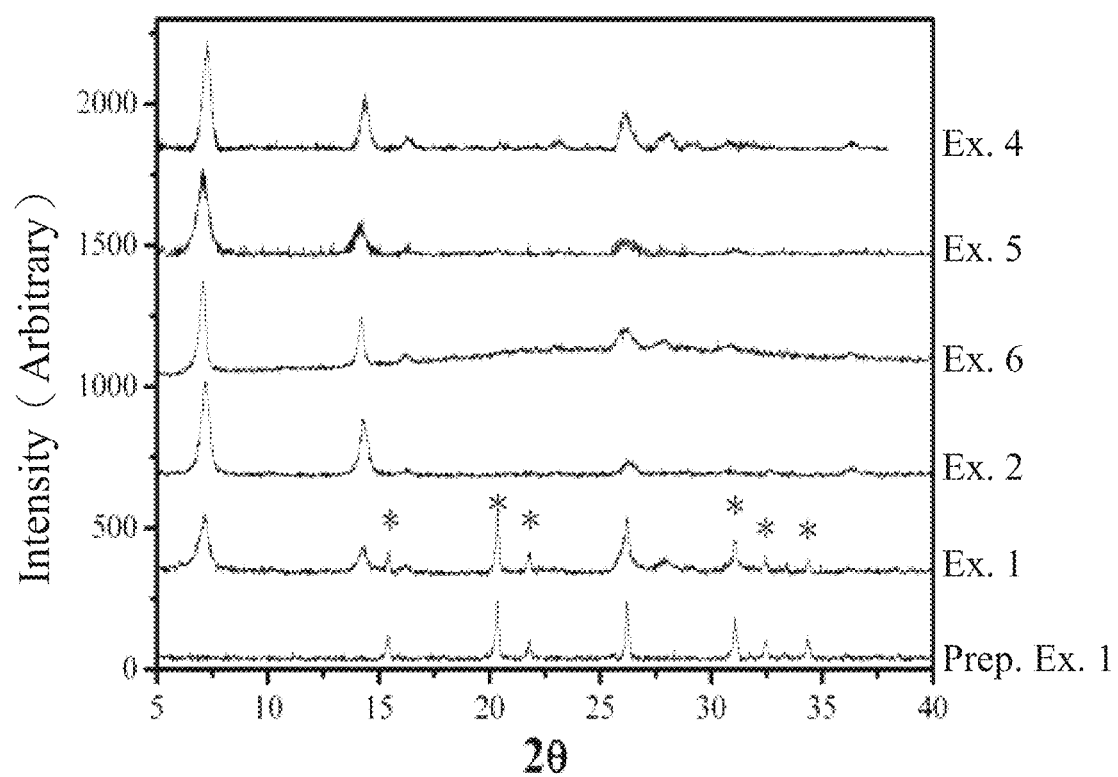
FIG. 2 shows X-ray diffraction curves of vanadium pentoxide powders of Preparative Example 1 and each of vanadium pentoxide-based active materials of Examples 1, 2, 4, 5, and 6, illustrating X-ray diffraction analysis results thereof.

X-Ray Diffraction Analysis:

A. Analysis Method:

Vanadium pentoxide of Preparative Example 1 and each of the vanadium pentoxide-based active materials of Examples 1, 2, 4, 5, and 6 were subjected to X-ray diffraction analysis using an X-ray wavelength of 1.54 A. The results are shown in FIG. 2. In addition, the vanadium pentoxide-based active material of Example 3 was subjected to a synchrotron X-ray diffraction analysis using an X-ray wavelength of 1.032 Å. The data obtained thereby was then converted into the data at the X-ray wavelength of 1.54 Å via a software. The result is shown in FIG. 3.

B. Result and Discussion:

As shown in FIG. 2, X-ray diffraction peaks of vanadium pentoxide (indicated by "*") were observed in the spectrum of the vanadium pentoxide-based active material of Example 1, while no diffraction peak of vanadium pentoxide was observed in the spectrum of the vanadium pentoxide-based active material of Example 2, indicating that the vanadium pentoxide-based active material of Example 1 contains unreacted vanadium pentoxide and that the vanadium pentoxide-based active material of Example 2 does not contain unreacted vanadium pentoxide. It is thus demonstrated that a minimum molar ratio of melamine to vanadium pentoxide of 0.67 is required to obtain a pure vanadium pentoxide-based active material.

Figure 3:
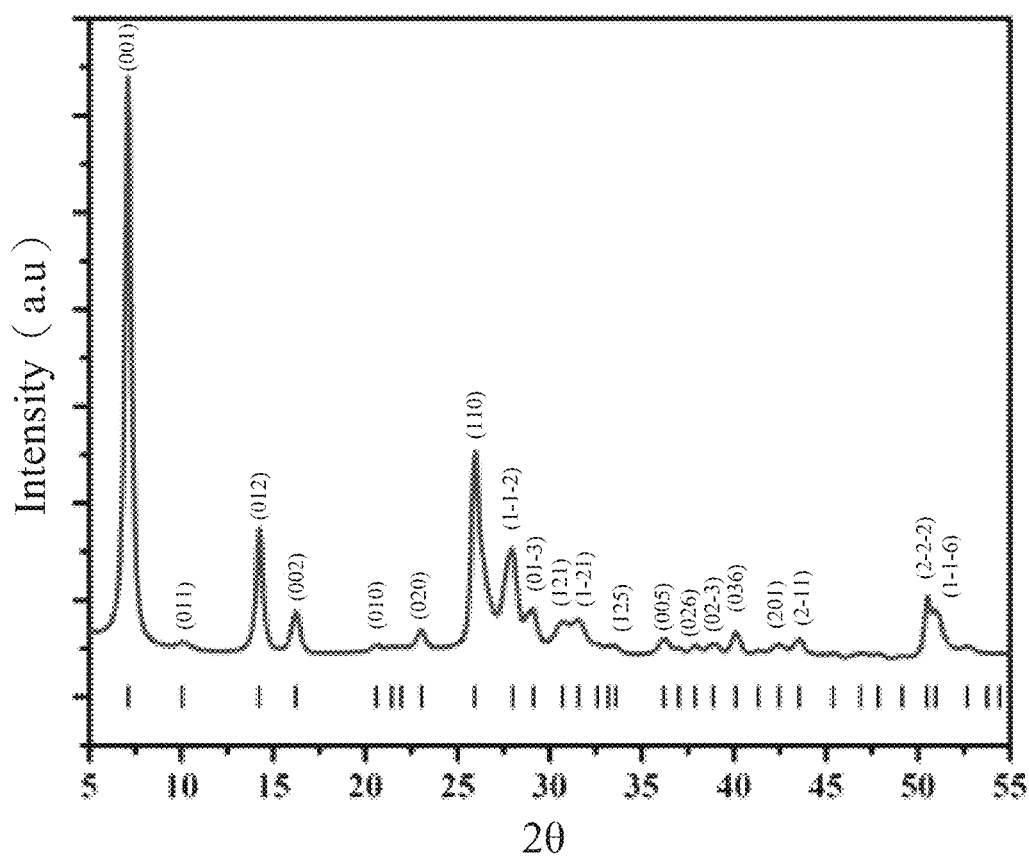
FIG. 3 shows a synchrotron X-ray diffraction curve illustrating a synchrotron X-ray diffraction analysis result of the vanadium pentoxide-based active material of Example 3.

The X-ray diffraction pattern of FIG. 3 was indexed by Treor program to resolve the space group of the vanadium pentoxide-based active material of Example 3 as P-1, which belongs to a triclinic crystal system with lattice parameters of a=4.30, b=8.86, c=14.90, α=61.35, β=73.42, and γ=88.55. In addition, the (001) peak of the vanadium pentoxide-based active material of Example 3 was found to be shifted toward a lower angle of 7.11°, showing an increase of vanadium pentoxide interlayer distance from 5.75 Å to 12.41 Å. It is thus demonstrated that in the vanadium pentoxide-based active material of the disclosure, the vanadium pentoxide interlayer distance can be extended by confining the triazine derivative between the parallel vanadium pentoxide platelets so as to reduce lattice stress during the intercalation and deintercalation processes of the alkali metal ion.

FIG. 2 also shows that the X-ray diffraction peaks of the vanadium pentoxide-based active materials of Examples 4 to 6 are similar to those of the vanadium pentoxide-based active material of Example 2, indicating that the vanadium pentoxide-based active material made from vanadium pentoxide doped with the transition metal salt has a structure similar to that of the vanadium pentoxide-based active material made from vanadium pentoxide undoped with the transition metal salt.

Thermogravimetric Analysis:

A. Analysis Method:

Thermogravimetric analysis was implemented using a thermogravimeter (Manufacturer: Perkin Elmer; Model: Pyris 1 TGA). The vanadium pentoxide-based active material of Example 3 was heated from 50° C. to 600° C. under a nitrogen atmosphere at a heating rate of 5° C./min. The result is shown in FIG. 4.

Figure 4:
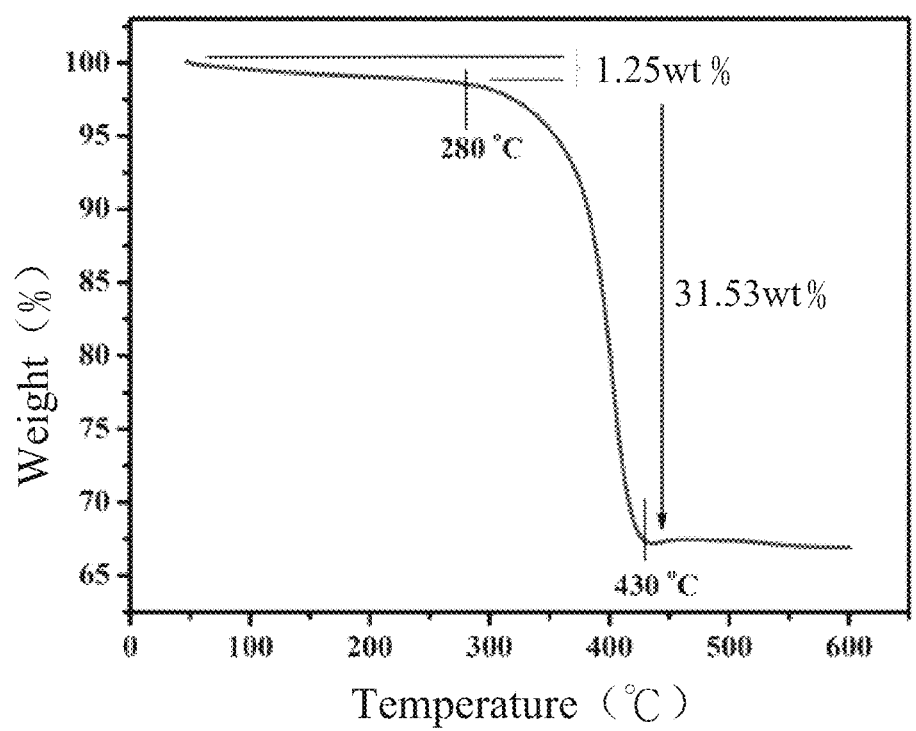
FIG. 4 is a diagram illustrating a thermogravimetric analysis result of the vanadium pentoxide-based active material of Example 3.

B. Result and Discussion:

As shown in FIG. 4, 1.25% of weight loss is seen at 280° C., which is accounted for the trapped crystal water in the lattice and the adsorbed water molecules on the surface. The weight loss from 280° C. to 430° C. is 31.53%, which is attributed to decomposition of melamine. There is no significant weight lost at a temperature that is above 430° C. From the thermogravimetric analysis result, the empirical molecular formula of the vanadium pentoxide-based active material of Example 3 is postulated as $V_2O_5 \cdot 0.67 C_3H_6N_6 \cdot 0.19 H_2O$. Since a vacuum drying step is implemented in the method for making the vanadium pentoxide-based active material, the fraction of water molecules can be discarded. Therefore, the vanadium pentoxide-based active material of Example 3 can be represented by a formula of $(C_3H_6N_6)_{0.67} V_2O_5$, i.e., a molar ratio of melamine to vanadium pentoxide in the vanadium pentoxide-based active material of Example 3 is 0.67.

Fourier Transform Infrared Spectrum (FTIR Spectrum) Analysis:

A. Analysis Method:

Each of vanadium pentoxide of Preparative Example 1 and the vanadium pentoxide-based active material of Example 3 was analyzed using a Fourier transform infrared spectrometer (Manufacturer: Thermo Fisher Scientific; Model: Nicolet Nexus-670). The result is shown in FIG. 5.

Figure 5:
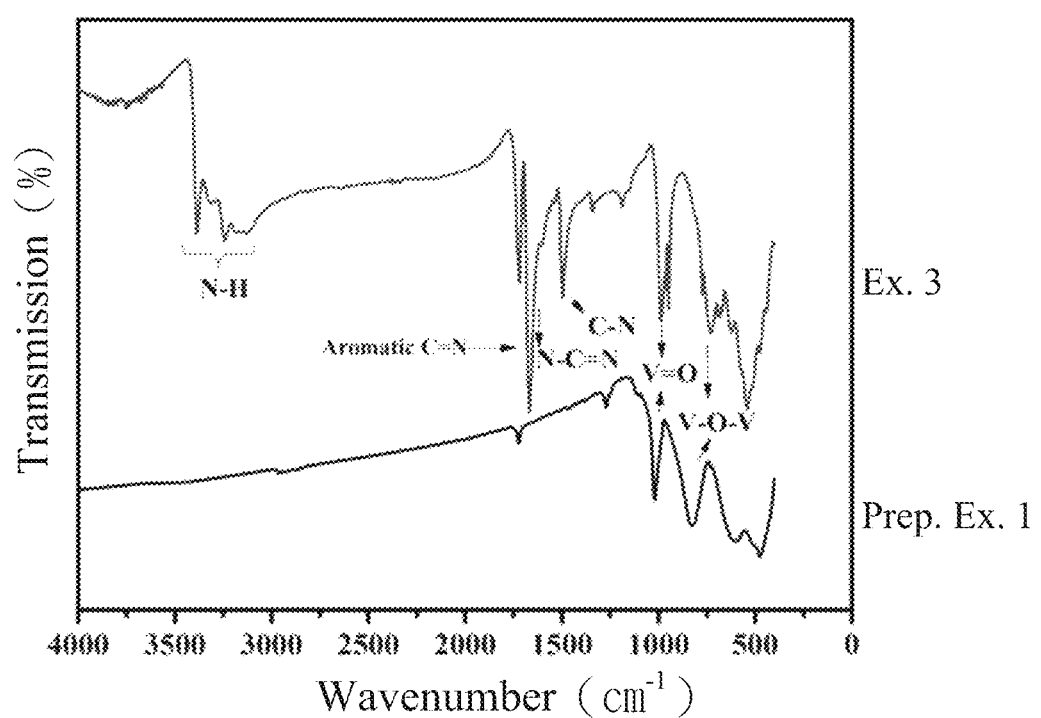
FIG. 5 shows Fourier Transform Infrared (FTIR) spectra of the vanadium pentoxide powders of Preparative Example 1 and the vanadium pentoxide-based active material of Example 3, illustrating the FTIR analysis results thereof.

B. Result and Discussion:

As shown in FIG. 5, in the spectrum of the vanadium pentoxide-based active material of Example 3, the transmission seen around 3500-3100 $cm^{-1}$ corresponds to NH-stretching vibration, indicating the presence of amino group of triazine in the vanadium pentoxide-based active material. A N—C—N bending peak observed at a wavenumber of 1584 $cm^-$ and a C—N stretching peak seen at a wavenumber of 1485 $cm^{-1}$ indicate that the presence of melamine in a hybrid structure of the vanadium pentoxide-based active material of Example 3 is well-established.

It should be noted that from the results of the X-ray diffraction analysis and the Fourier transform infrared spectrum analysis, the presence of melamine in a hybrid structure of the vanadium pentoxide-based active material of Example 3 is thus well-established. Inter-molecular and intra-molecular hydrogen bonds formed in the vanadium pentoxide-based active material and the self-assembly of melamine that is confined by parallel vanadium pentoxide platelets, assist in maintaining structural reversibility and reducing lattice stress during the intercalation and deintercalation processes of the alkali metal ion so as to effectively prevent the vanadium pentoxide platelets from puckering. Therefore, the capacity of the alkali metal ion battery including the cathode coated with the vanadium pentoxide-based active material is not undesirably lost after a plurality of charge/discharge cycles in a relatively wide potential range.

Figure 6:
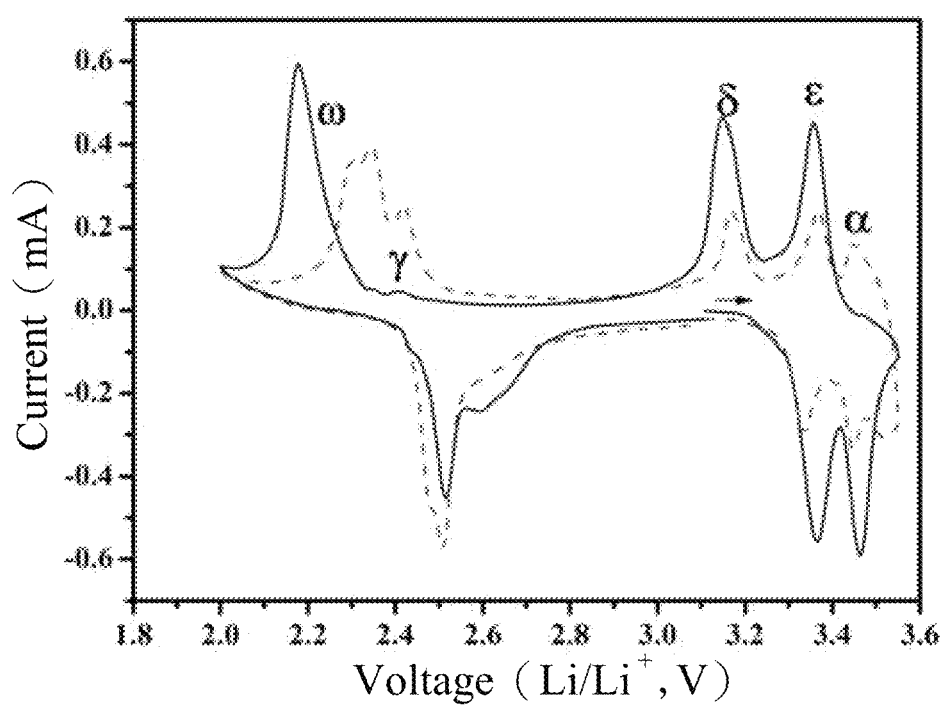
FIG. 6 shows a cyclic voltammetry diagram of a lithium ion battery of Comparative Application Example 1, illustrating an analysis result thereof obtained by a cyclic voltammetry method.
Figure 7:
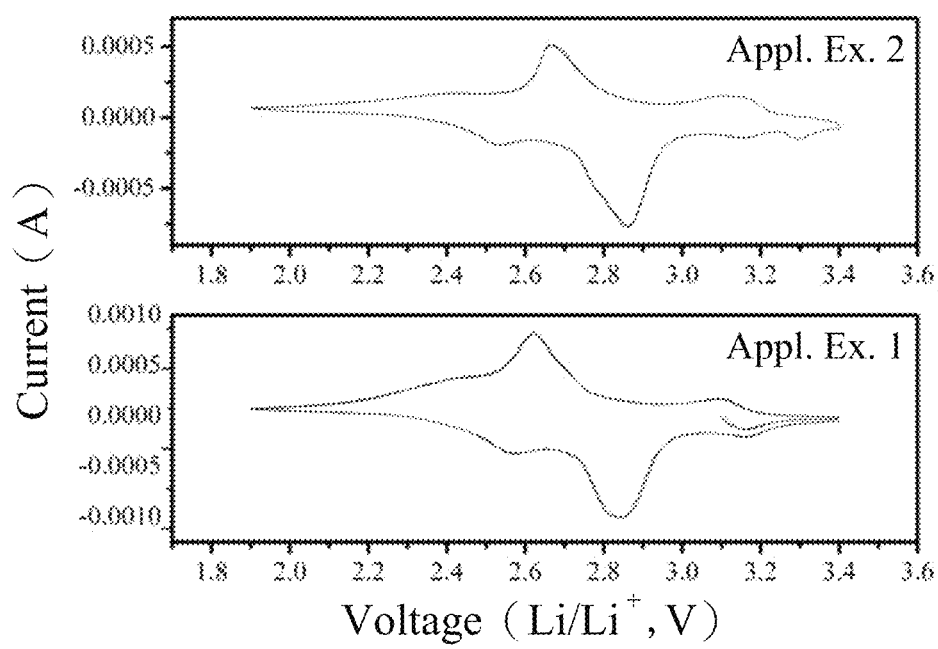
FIG. 7 shows cyclic voltammetry diagrams of each of lithium ion batteries of Application Examples 1 and 2, illustrating analysis results thereof obtained by the cyclic voltammetry method.
Figure 8:
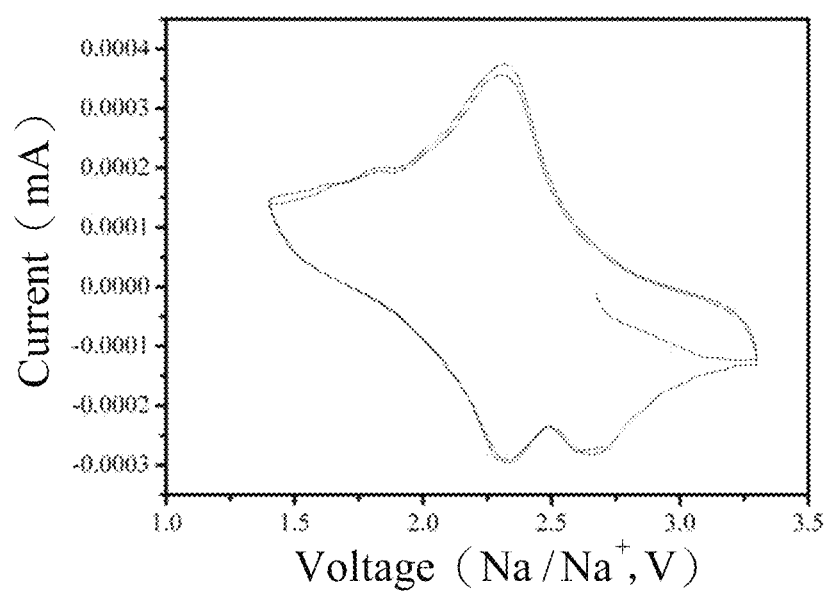
FIG. 8 shows a cyclic voltammetry diagram of a sodium ion battery of Application Example 3, illustrating an analysis result thereof obtained by the cyclic voltammetry method.

Cyclic Voltammetry Analysis:

A. Analysis Method:

The lithium ion battery of Comparative Application Example 1, each of the lithium ion batteries of Application Examples 1 and 2, and the sodium ion battery of Application Example 3 were subjected to a cyclic voltammetry analysis using a three-electrode potentiostat/galvanostat instrument (Manufacturer: Seiko Instruments Inc.; Model: EG & G VersaStat II). The cyclic voltammetry analysis was implemented at a scan rate of 0.1 mV/s. The results are shown in FIGS. 6, 7, and 8 for the lithium ion battery of Comparative Application Example 1, the lithium ion batteries of Application Examples 1 and 2, and the sodium ion battery of Application Example, respectively. In FIG. 6, the solid-lined curve represents the first cycle, and the dash-lined curve represents the second cycle.

B. Result and Discussion:

As shown in FIG. 6, for the lithium ion battery of Comparative Application Example 1 in which the active material for the cathode is composed of vanadium pentoxide alone, a significant difference can be observed between the first cycle and the second cycle. Specifically, irreversible γ- and ω-phases were observed in the first scan. The irreversible γ- and ω-phases shifted to higher potentials and the currents of ε- and δ-phases simultaneously decreased significantly in the second cycle, indicating that an irreversible puckered structure is formed in the active material (i.e., vanadium pentoxide) for the cathode during the first and second cycles. Therefore, the lithium ion battery of Comparative Application Example 1 cannot conduct repeated charge/discharge cycles at a relatively wide potential range, for example, from 1.9 to 3.5 V.

Referring to FIGS. 7 and 8, for each of the lithium ion batteries of Application Examples 1 and 2 and the sodium ion battery of Application Example 3, the curve of the first cycle and the curve of the second cycle overlapped substantially, indicating that the active material for the cathode that is made by the vanadium pentoxide-based active material of Example 3 is stable without formation of the irreversible puckered structure in the first and second cycles of each of the lithium ion batteries of Application Examples 1 and 2 and the sodium ion battery of Application Example 3. Therefore, it is demonstrated that each of the lithium ion batteries of Application Examples 1 and 2 and the sodium ion battery of Application Example 3, in which the vanadium pentoxide-based active material of the disclosure is used as the active material for the cathode, can perform repeated charge/discharge cycles at a relatively wide potential range, for example, from 1.9 to 3.5 V without substantially losing the capacity.

Capacity Analysis:

A. Analysis Method:

The lithium ion batteries of Comparative Application Example 1 and Application Example 1 are respectively subjected to a plurality of charge/discharge cycles in a potential ranging from 1.9 V to 3.5 V, at a rate of 0.1 C, and at a temperature of 25° C. using a constant current-constant voltage (CC-CV) protocol. The results are shown in FIG. 9.

The capacity retention rate (in %) is defined as a ratio of the discharge capacity of the battery after the charge/discharge cycle(s) to the initial discharge capacity of the battery.

Figure 9:
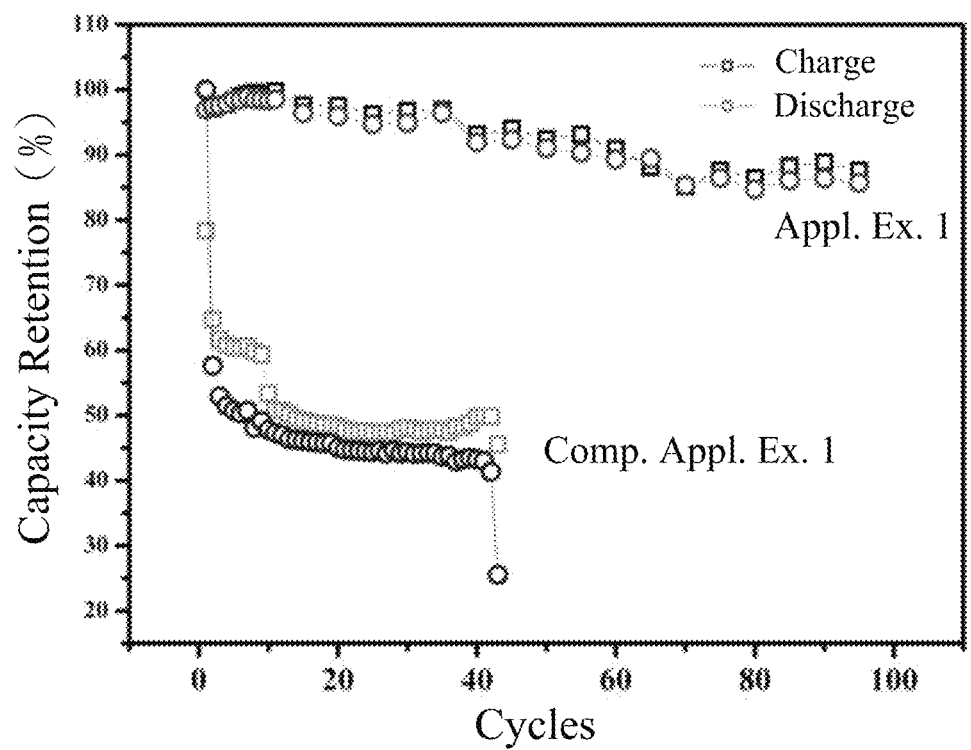
FIG. 9 shows diagrams illustrating capacity retention rates of the lithium ion batteries of Application Example 1 and Comparative Application Example 1.

B. Result and Discussion:

As shown in FIG. 9, the capacity retention rate of the lithium ion battery of Comparative Application Example 1 was lowered to below 60% after 5 charge/discharge cycles. However, the capacity retention rate of the lithium ion battery of Application Example 1 was maintained at about 85% after 100 charge/discharge cycles. It is demonstrated again that the lithium ion battery, in which the vanadium pentoxide-based active material of the disclosure is used as the active material for the cathode, can perform repeated charge/discharge cycles without substantially losing the capacity.

In the vanadium pentoxide-based active material of the disclosure, the triazine derivative of Formula (I) is used as a structure stabilizing agent, enabling the vanadium pentoxide-based active material to be formed as a single phase hybrid structure with extended interlayer distance. Therefore, the capacity of the alkali metal ion battery including the cathode that is coated with the vanadium pentoxide-based active material of the disclosure is not undesirably lost after a plurality of charge/discharge cycles in a relatively wide potential range. The aforesaid shortcomings resulting from using vanadium pentoxide alone as the active material for the cathode of the alkali metal ion battery can thus be overcome.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for making a vanadium pentoxide-based active material for a cathode of an alkali metal ion battery, comprising steps of:

a) preparing an aqueous solution of a triazine derivative of Formula (I)

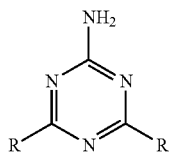

wherein each R independently represents hydrogen or an amino group; and b) adding vanadium pentoxide to the aqueous solution of the triazine derivative under stirring for a period of time, so as to permit condensation among hydrolyzed vanadium pentoxide along with self-assembly of the triazine derivatives to obtain a reaction solution containing the active material.

2. The method according to claim 1, wherein the triazine derivative is selected from the group consisting of melamine, 2-amino-1,3,5-triazine, and a combination thereof.

3. The method according to claim 1, wherein the vanadium pentoxide is doped with a transition metal salt.

4. The method according to claim 3, wherein the transition metal salt is selected from the group consisting of a manganese salt, a copper salt, a tin salt, and combinations thereof.

5. The method according to claim 1, wherein in step b), the reaction solution has a reduced pH value.

6. The method according to claim 5, wherein the pH value is reduced by 3.6.

7. The method according to claim 1, further comprising steps of:

c) separating the active material from the reaction solution; and d) drying the active material to obtain a brownish powder.

8. An active material for a cathode of an alkali metal ion battery, comprising a single phase hybrid structure, which includes
vanadium pentoxide, and
a triazine derivative of Formula (I),

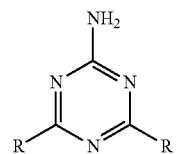

wherein
each R independently represents hydrogen or an amino group, and
a molar ratio of the triazine derivative to the vanadium pentoxide is in a range from 0.4 to 0.8.

9. A cathode of an alkali metal ion battery, comprising the active material according to claim 8.

10. An alkali metal ion battery, comprising the cathode according to claim 9.

11. The active material according to claim 8, wherein the triazine derivative is selected from the group consisting of melamine, 2-amino-1,3,5-triazine, and a combination thereof.

12. The active material according to claim 8, wherein the vanadium pentoxide is doped with a transition metal salt.

13. The active material according to claim 12, wherein the transition metal salt is selected from the group consisting of a manganese salt, a copper salt, a tin salt, and combinations thereof.

* * * * *

UNITED STATES PATENT AND TRADEMARK OFFICE
CERTIFICATE OF CORRECTION

PATENT NO. : 11,264,601 B2  
APPLICATION NO. : 16/189005  
DATED : March 1, 2022  
INVENTOR(S) : Horng-Yi Tang et al.

Page 1 of 1

It is certified that error appears in the above-identified patent and that said Letters Patent is hereby corrected as shown below:

On the Title Page

(73) Assignee: "National Chi Nan University, Nantou (TW)" should read "National Chi Nan University, Nantou (TW); Academia Sinica, Taipei (TW)"

Signed and Sealed this  
Nineteenth Day of September, 2023

Katherine Kelly Vidal  
*Director of the United States Patent and Trademark Office*